Dec. 31, 1935.                B. KOKEMPER                2,025,990
               PASTEURIZING AND STERILIZING DEVICE
                       Filed May 25, 1931
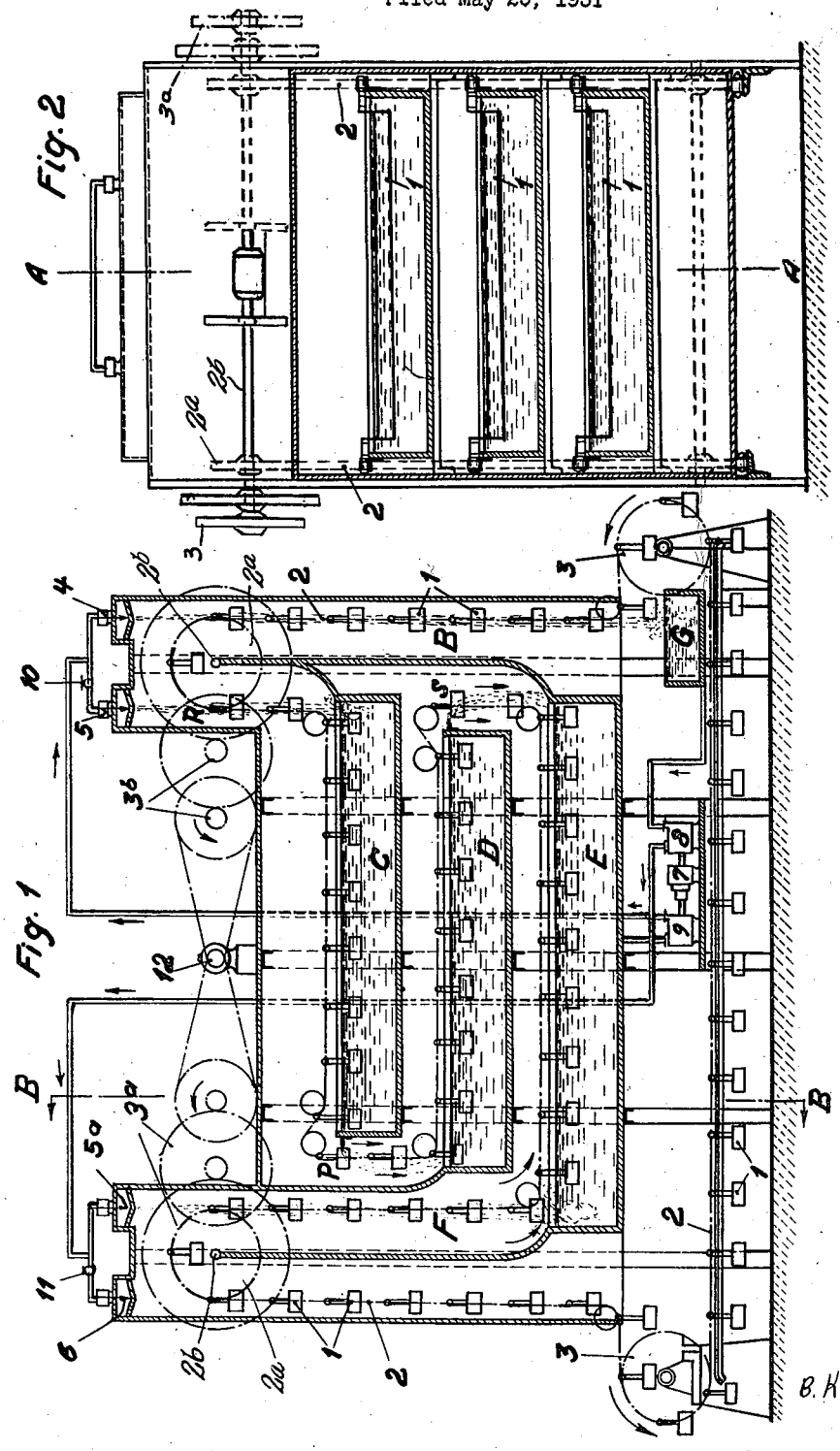

Patented Dec. 31, 1935

2,025,990

UNITED STATES PATENT OFFICE 2,025,990

PASTEURIZING AND STERILIZING DEVICE

Bernardo Kokemper, Porto Alegre, Brazil

Application May 25, 1931, Serial No. 539,906
In Germany June 4, 1930

1 Claim. (Cl. 126—272)

This invention relates to a pasteurizing and sterilizing device intended especially for beverages in bottles and similar receptacles, such as milk, beer, fruit juices, non-alcoholic and fermented beverages and the like, the filled bottles or other receptacles being conveyed in baskets or troughs or similar containers immersed into the liquid of the pasteurizing vat in which they are exposed to the temperature of that liquid. The vat or vats serve solely for the pasteurizing process, whereas the preheating and the cooling is effected by spraying or sprinkling. In the known devices the preheating and the sprinkling is effected in vats, or in baths respectively, and as this is now obviated there is obtained a great saving in weight and space. On the other hand, the old devices of the type just stated excel those in which the pasteurization is effected by spraying or sprinkling in this respect that the liquid is with certainty subjected to the requisite temperature as long as the bottles or other vessels containing the beverage are in the vats or baths.

Another advantage of the present improved device is that the vats containing the baths are arranged horizontally and the means for moving the baskets or troughs or other containers for the bottles, etc., are arranged outside the vats so that they can be continually watched and lubricated and, thus, the consumption of power and the wear and tear are considerably reduced.

Still another advantage resides in the subdivision of the vats or baths so that the several vats are arranged one above the other and offset in the horizontal direction whereby the required space is diminished and the temperature in the several individual vats can be regulated and determined just as required. Still another advantage is afforded by the provision of spraying or sprinkling devices which are so designed as to protect the bottles, etc., from loss of heat when they travel from vat to vat; these devices are completely independent of those used for the preheating of the bottles, etc., as will appear more fully from the detailed description following.

The filled bottles or other receptacles that are conveyed in the baskets or troughs or other containers are pre-heated preferably by hot water prior to their entering the pasteurizing vats, the water or other fluid streaming in a direction counter to that of the respective containers. The preheating water is cooled down during this procedure, and at the end of the path of the bottles, when the pasteurization procedure has been finished, it is used for cooling down the bottles, etc., the water being now again heated in counter-current by the hot bottles. It will be obvious from this statement that the consumption of heat by this device is small, and that also no fresh water need be supplied. The bottles, etc., move in salt-free water whereby they are prevented from becoming damp when they leave the device, and can be discharged without being separately dried by hand.

The invention is illustrated diagrammatically and by way of example on the accompanying drawing on which Figure 1 is a longitudinal section about in the plane A—A of Fig. 2, and Figure 2 is a transverse section about in the plane B—B of Fig. 1.

On the drawing, I denotes carriers which extend transversely through the vats C, D and E arranged in spaced relation one above another. The vats are offset with respect to each other in the horizontal direction and the lowermost vat in addition underlies all of the vats. The carriers are suspended from chains 2 of endless conveyors and they receive the filled bottles when they arrive in the lowermost position at the front side of the device; they are then in lower right-hand corner of Fig. 1. The filled carriers are drawn upwardly through a vertical shaft B, and while passing therethrough they are sprayed or sprinkled from above by means of a spray or sprinkler 4 supplied with hot water from a vat E located near the lower end of said shaft. The path or circuit of the water will be described hereinafter.

The endless conveying chains carrying the filled carriers are led over guide rolls R, and the troughs are then moved downwardly to and into the uppermost pasteurization vat C, and while passing through the short vertical shaft leading to this vat, they are subjected to the spraying or sprinking action of a spraying or sprinking device 5 also supplied with hot water from the lowermost vat E by means hereinafter described.

The carriers pass through the vat C from the right to the left, and at the end of this portion of their path they leave the vat at P and pass downwardly to and into the next vat D through which they are conducted from the left to the right. They leave this vat at S and are now again conducted downwardly into the lowermost vat E through which they pass from the right to the left. Finally, they leave this vat and pass upwardly through a vertical shaft F located at the rear of the device, and while passing through this shaft, the carriers and the bottles in them, are subjected to the action of cooling water coming down from the spraying or sprinkling device 5ª. P and S are practically short vertical shafts through which flows water, namely water overflowing from the vat C into the vat D and from vat D into the vat E, the overflowing water flowing also over the carriers and bottles just passing through said short shafts.

The normal circuit of the water is this: Cooled water is sucked from the basin G by the pump 8 and delivered up to the spray or sprinkler 5ª (the spray or sprinkler 6 is employed only under circumstances, especially if the apparatus is to be emptied) and from the spray or sprinkler 5ª down through the shaft F into the vat E, the water being heated while passing through the latter.

While the filled carriers pass first upwardly through the shaft F and then again downwardly through the last shaft located just at the rear of the device, they are again subjected to the action of water coming down from the sprays or sprinklers 5ª and 6 which receive cool water from the basin G. The bottles, etc., in the carriers are removed from them when they have arrived about in front of the vat E. That may be effected manually or mechanically by any suitable means. I have abstained from showing an example of such means, as that does not form a part of this invention.

The chains 2, of which there are two, one on the one side of the device, the other on the other side of the same, as appears from Fig. 2, are endless chains, and operate over supporting and driving members in the form of sprocket wheels 2ª and carried by rotatable shafts 2ᵇ, the said supporting and driving members being respectively arranged above the extended end of the lowermost vat and the opposite end of the uppermost vat. The lowermost portion of chain 2 runs horizontally, below the vat E, and is guided correspondingly by rolls 3. The empty carriers pass finally from the rear end of the device back to the front end of the same where they are again filled with bottles or the like that proceed then further onward and through the circuit constituted by the chains, and in this way the procedure is continually performed and repeated.

The cooled water collected in the basin G is pumped to the sprays or sprinklers 5ª and 6 by means of a pump 8 driven by an electric motor 7; this latter drives also a pump 9, by means of which the hot water contained in the vat E is pumped upwardly to the sprays or sprinklers 4 and 5. 10 and 11 are cocks for regulating the supply of the water to the sprays or sprinklers 5 and 6.

12 is another motor which serves for moving the chains by means of two gearings 3ª and 3ᵇ.

The normal circuit of the water is this: Cooled water is sucked from the basin G by the pump 8 and delivered to the spray or sprinkler 5ª (the spray or sprinkler 6 is employed only under certain circumstances, especially if the apparatus is to be emptied), from that spray or sprinkler down through the shaft F into the vat E, the water being heated while passing through the shaft; the heated water is now sucked from the vat E by the pump 9 and driven upwardly to the spray or sprinkler 4, from which it returns through the shaft B into the basin G, the water being now cooled while passing through this shaft.

A certain part of the water, viz. that coming from the spray or sprinkler 6, may be conducted away as waste water. This amount of water is practically continually replaced by steam that is introduced into the vats in order to increase the temperature of the water contained in them, the temperature being, of course, that required for the pasteurization and the sterilization, and the amount of steam being correspondingly chosen. It will be obvious that the amount of water in the vats is increased by the water of condensation, and the surplus is continually or not continually, as the case may be, led off through the shaft below the spray or sprinkler 6. The several amounts may, of course, be determined or regulated just as desired or requisite. The surplus of water may be led off also through cocks or the like. It is a matter of course that thermometers and the other instruments, etc., requisite for carrying out the proper operation of the device are provided.

I wish it to be understood that instead of three vats less or more than three may be employed, dependent upon the performance desired, the available space and other circumstances. I wish it further to be understood that the conduction and distribution of the water may be varied. Particular advantages are afforded, firstly, by the provision that all conveying members lie outside the water so that they can be easily and amply lubricated and are, therefore, by far less subjected to wear and tear, and secondly, by the position of the places where the carriers are filled and where they are emptied, these positions being such that filling and emptying the carriers can be effected very conveniently either manually or mechanically, as desired.

I claim:

A pasteurizing and sterilizing apparatus, comprising in combination a plurality of superposed vats offset with respect to each other in the horizontal direction and the lowermost vat in addition underlying all of the upper vats, all of the vats containing liquid of pasteurizing temperature, carriers adapted to receive the vessels to be treated, an endless conveyer supporting the carriers and arranged outside the pasteurizing liquid and adapted to carry the vessels to, through and from said vats, said conveyer including two supporting and driving members one of which is arranged above the uppermost vat and the other above the extended end of the lower vat, means for spraying a heating liquid of pasteurizing temperature upon the carriers as they are carried to the first mentioned supporting and driving member, means for spraying liquid of pasteurizing temperature upon the carriers moving from the first mentioned supporting and driving member to the uppermost vat, means for spraying liquid of pasteurizing temperature upon the carriers travelling from one vat to another, said liquid being overflow liquid from one vat to another, means for spraying a liquid in a cooled condition upon the carriers carried away from the lower vat to the last named supporting and driving member and independent means for keeping said pasteurizing and cooling liquid in circulation.

BERNARDO KOKEMPER.